(12) United States Patent
Arino de la Rubia et al.

(10) Patent No.: US 11,159,534 B1
(45) Date of Patent: Oct. 26, 2021

(54) SYSTEMS AND METHODS FOR REDUCING VIRALITY OF CONTENT FROM DOMAINS WITH QUESTIONABLE REPUTATION IN A SOCIAL NETWORKING SYSTEM

(71) Applicant: Facebook, Inc., Menlo Park, CA (US)

(72) Inventors: Eduardo Arino de la Rubia, Menlo Park, CA (US); Xiaoshan Zhang, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 362 days.

(21) Appl. No.: 16/366,250

(22) Filed: Mar. 27, 2019

(51) Int. Cl.
| | |
|---|---|
| *G06F 15/16* | (2006.01) |
| *H04L 29/06* | (2006.01) |
| *G06F 16/2457* | (2019.01) |
| *G06Q 50/00* | (2012.01) |
| *G06F 16/951* | (2019.01) |

(52) U.S. Cl.
CPC ...... *H04L 63/102* (2013.01); *G06F 16/24578* (2019.01); *G06F 16/951* (2019.01); *G06Q 50/01* (2013.01); *H04L 63/101* (2013.01)

(58) Field of Classification Search
CPC ... H04L 51/32; H04L 51/14; G06F 16/24578; G06F 16/9536; G06Q 50/01; G06Q 30/0218

USPC ............................................. 709/250; 726/1
See application file for complete search history.

(56) References Cited

U.S. PATENT DOCUMENTS

| | | | |
|---|---|---|---|
| 2015/0101008 A1* | 4/2015 | Zent .................. | G06F 16/9535 726/1 |
| 2017/0277691 A1* | 9/2017 | Agarwal ............... | H04W 4/21 |
| 2018/0217981 A1* | 8/2018 | Rakshit ................. | H04L 51/32 |

* cited by examiner

*Primary Examiner* — Wing F Chan
*Assistant Examiner* — Andrew Woo
(74) *Attorney, Agent, or Firm* — Fenwick & West LLP (57) ABSTRACT

Systems and methods are disclosed herein for receiving, by a social networking system, from a domain, a request to publish a content item. The social networking system publishes the content item and receives a request to reshare the content item from a user. The social networking system responsively determines a reputability score for the domain based on a number of other domains that point to the domain in the context of the social network interface, and determines whether the reputability score exceeds a threshold score. If the reputability score exceeds the threshold, the social networking system publishes the content item using a default ranking. Otherwise, the content item is published using a discounted ranking derived from taking a discount from the default ranking such that the content item is ranked lower relative to other content items than it would have been if the default ranking had been used.

18 Claims, 3 Drawing Sheets

SYSTEMS AND METHODS FOR REDUCING VIRALITY OF CONTENT FROM DOMAINS WITH QUESTIONABLE REPUTATION IN A SOCIAL NETWORKING SYSTEM

BACKGROUND

This disclosure relates generally to reducing virality of undesirable content in a social networking system. Related art social networking systems enable users to post content to a newsfeed, where other users may view that posted content, and may share (or reshare) the posted content within their friend circle. If the content is shared at a high rate, it gains notoriety and becomes viral as more people see the content and share the content. Users tend to feel that viral content is validated as non-spam, reputable, or otherwise holding value because so many other users have vouched for its content. Generally, this causes the best content to become self-validating. However, spam-like content that may be undesirable, such as content that lacks, or goes against, proven scientific principles, or content that may obscure the truth (e.g., an article a celebrity is in a relationship that the celebrity is likely not in), may become viral and may thus be caused to be considered as desirable or non-spam if shared by enough users. Related art social networking systems lack safeguards to ensure that spam content that lacks value is allowed to be shared, consistent with free speech principals, while also being prevented from achieving viral status.

SUMMARY

Systems and methods are disclosed herein for reducing the likelihood that content lacking value achieves viral status. Generally, the manner in which the likelihood of such content becoming viral is reduced is by evaluating content source, instead of the content itself. To this end and others, in some embodiments, a social networking system receives a request to publish a content item from a domain outside of the social networking system to a social network interface of the social networking system. For example, the social networking system receives a request to post an article from a certain website to one or more newsfeeds of the social networking system.

In response to receiving the request, the social networking system publishes the content item to the social network interface (e.g., adds it to a newsfeed of at least one user, such as a user who is connected in a social graph of the social networking system to the domain (e.g., because the user indicated that the user likes the domain)). The social networking system then receives a request to reshare the content item from a user interacting with the social network interface. For example, the social networking system receives a request from a user who wishes to repost the content item such that the user's friends on the social networking system can view the content item. In response to receiving the request to reshare the content item, the social networking system determines a reputability score for the domain based on a number of other domains that point to the domain in the context of the social network interface. For example, the social networking system determines that domains with more other domains pointing to them are more reputable than those with fewer domains pointing to them.

The social networking system then determines whether the reputability score exceeds a threshold score in order to determine whether mitigating action should be taken to ensure that the content item does not go viral if it comes from a source having questionable reputation. In response to determining that the reputability score exceeds the threshold score, the social networking system publishes the content item to additional users connected to the user using a default ranking of the content item that ranks the content item relative to other content items for display to the user in the social network interface. In response to determining that the reputability score does not exceed the threshold score, the social networking system publishes the content item to the additional users using a discounted ranking derived from taking a discount from the default ranking such that the content item is ranked lower relative to other content items than it would have been if the default ranking had been used. Thus, content items from sources with questionable reputability are not censored, but are also substantially less likely to achieve viral status in the social networking system than if left unchecked.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
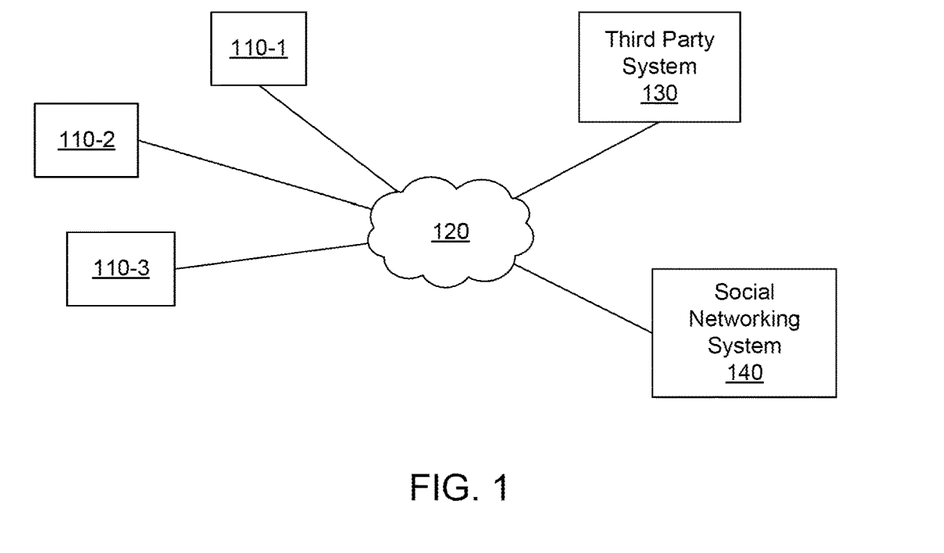
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
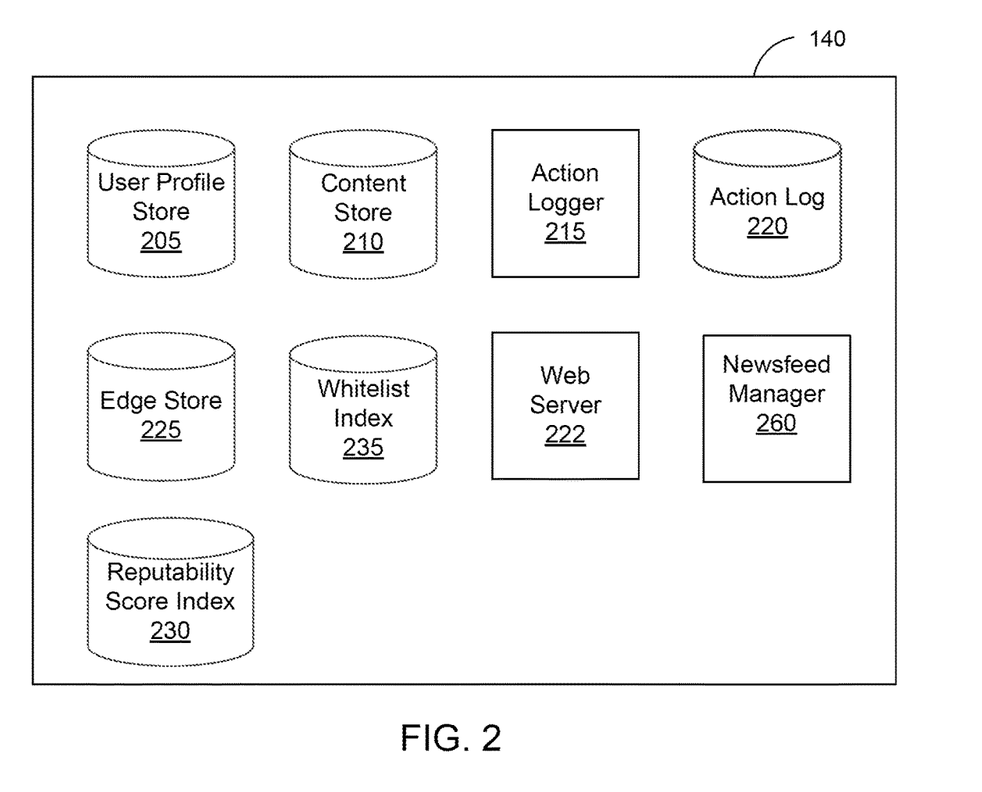
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a reputability score index 230, and a whitelist index 235, and a web server 222. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content, including content coming from a source with questionable reputability or content otherwise lacking in value. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

Reputability score index 230 is a database that maps domains to scores representing their reputability. For example, online system 140 may compute a reputability score for a domain based on other domains that point to the domain (e.g., similar to the PageRank algorithm). Online system 140 may determine which other domains point to the domain within the context of online system 140, as determined based on data from edge store 225. Online system 140 may then map each reputability score to the domain to which the reputability score corresponds, and may store the mapping in reputability score index 230.

The whitelist index 235 includes identifiers of domains that are to be excluded from a discounted ranking regardless of the reputability score assigned to those domains. Online system 140 may reference whitelist index 235 when a reputability score is determined to be below a threshold before applying a discounted ranking to that domain, where, if the domain appears on whitelist index 235, the domain is excepted from having a discount ranking.

In one embodiment, the online system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 260 may generate stories for presentation to a user based on information in the action log 220 and in the edge store 225 or may select candidate stories included in the content store 210. One or more of the candidate stories are selected and presented to a user by the newsfeed manager 260.

For example, the newsfeed manager 260 receives a request to present one or more stories to an online system user. The newsfeed manager 260 accesses one or more of the user profile store 105, the content store 110, the action log 120, and the edge store 125 to retrieve information about the identified user. For example, stories or other data associated with users connected to the identified user are retrieved. The retrieved stories or other data are analyzed by the newsfeed manager 260 to identify candidate content items, which include content having at least a threshold likelihood of being relevant to the user. For example, stories associated with users not connected to the identified user or stories associated with users for which the identified user has less than a threshold affinity are discarded as candidate stories. Based on various criteria, the newsfeed manager 260 selects one or more of the candidate stories for presentation to the identified user.

In various embodiments, the newsfeed manager 260 presents stories to a user through a newsfeed including a plurality of stories selected for presentation to the user. The newsfeed may include a limited number of stories or may include a complete set of candidate stories. The number of stories included in a newsfeed may be determined in part by a user preference included in user profile store 205. The newsfeed manager 260 may also determine the order in which selected stories are presented via the newsfeed. For example, the newsfeed manager 260 determines that a user has a highest affinity for a specific user and increases the number of stories in the newsfeed associated with the specific user or modifies the positions in the newsfeed where stories associated with the specific user are presented.

The newsfeed manager 260 may also account for actions by a user indicating a preference for types of stories and selects stories having the same, or similar, types for inclusion in the newsfeed. Additionally, the newsfeed manager 260 may analyze stories received by the online system 140 from various users to obtain information about user preferences or actions from the analyzed stories. This information may be used to refine subsequent selection of stories for newsfeeds presented to various users.

The web server 222 links the online system 140 via the network 120 to the one or more client devices 110, as well as to the one or more third party systems 130. The web server 222 serves web pages, as well as other content, such as JAVA®, FLASH®, XML and so forth. The web server 222 may receive and route messages between the online system 140 and the client device 110, for example, instant messages, queued messages (e.g., email), text messages, short message service (SMS) messages, or messages sent using any other suitable messaging technique. A user may send a request to the web server 222 to upload information (e.g., images or videos) that are stored in the content store 210. Additionally, the web server 222 may provide application programming interface (API) functionality to send data directly to native client device operating systems, such as IOS®, ANDROID™, or BlackberryOS.

Virality Prevention for Content from Sources with Questionable Reputability

Figure 3A:
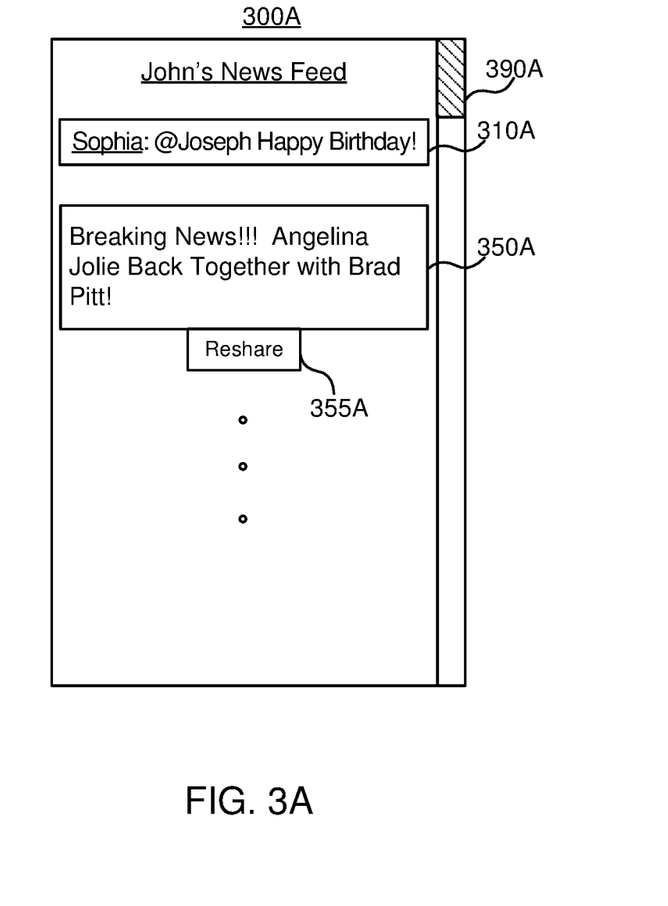
FIG. 3A is an exemplary user interface with content selected by way of a default ranking, in accordance with an embodiment.

FIG. 3A is an exemplary user interface with content selected by way of a default ranking, in accordance with an embodiment. FIG. 3A depicts newsfeed 300A, which is a user interface (otherwise referred to interchangeably herein as a social networking interface) that includes various content items from friends of a user named John, as well as from other entities and domains (e.g., domains providing sponsored content items). Newsfeed 300A includes post 310A, which is from a friend of John named Sophia (e.g., as determined based on a first order connection between John and Sophia on edge graph 225. Newsfeed 300A also includes post 350A, which, as illustrated, is sponsored content from a domain. Post 310A and post 350A, while described for illustrative purposes as content from a friend, and sponsored content from a domain, may be content viewable by a user from any source on a newsfeed.

Post 350A (and post 310A, although not depicted), may include reshare option 355A. Online system 240 may detect selection of reshare option 355A, and may responsively include post 350A on newsfeeds of other users, such as all users who are first-order connections (or friends) of John, as determined based on edge store 225. The determination of whether, and when, to include post 350A on newsfeeds of such other users will be described in further detail below responsive to selection of reshare option 355A. While reshare option 355A depicts the word "reshare," any functionality such as detection of selection of an option to react to post 350A (e.g., like, love, laugh, add custom comment, reply to another user's custom comment, etc.) by online system may cause post 350A to be reshared to users connected to the user who reacted to post 350A.

Scroll bar 390A indicates a position of newsfeed 300A at which a user (e.g., John) viewing newsfeed 300A has reached. The higher scroll bar 390A is positioned, the higher ranked the posts displayed on newsfeed 300A are (as determined by online system 140). The lower scroll bar 390A is positioned, the lower ranked the posts displayed on newsfeed 300A are.

Figure 3B:
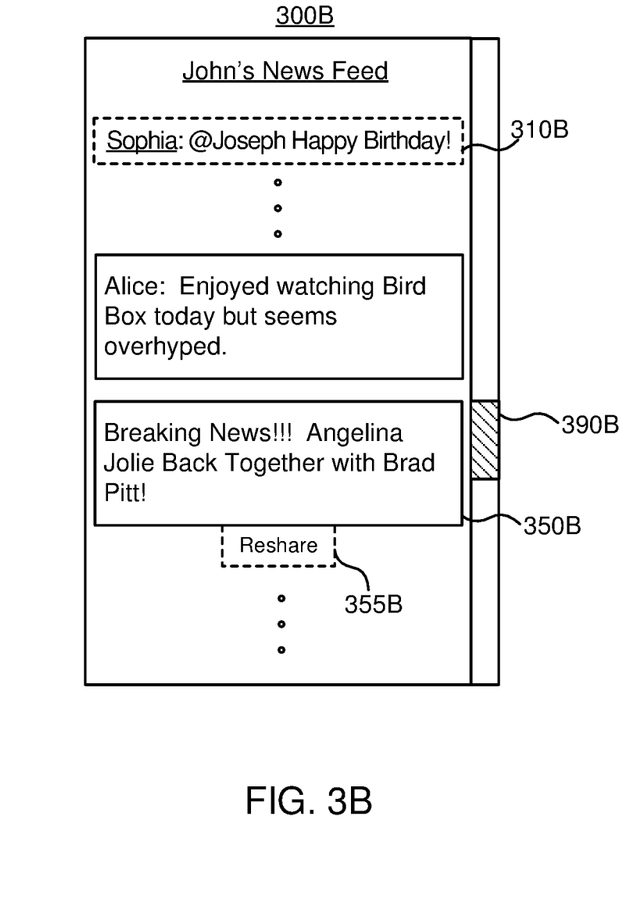
FIG. 3B is an exemplary user interface with content selected by way of a discounted ranking, in accordance with an embodiment.

FIG. 3B is an exemplary user interface with content selected by way of a discounted ranking, in accordance with an embodiment. Post 310B is the same post as post 310A, and is depicted in dashed lines to indicate that it is not displayed at the indicated position of scroll bar 390B. As depicted, scroll bar 390B is far lower down in newsfeed 300B than scroll bar 390A was in newsfeed 300A. Post 350B, which includes the same content item as included in post 350A, is viewable at the present position of newsfeed 300B that corresponds to scroll bar 390B, thus indicating a far lower ranking of post 350B as compared to post 350A. For example, the ranking may be discounted such that the user is very unlikely to scroll down far enough to ever see post 350B. In some cases, the post 350B may be not even be included in the ranking such that the post does not appear in the newsfeed 300B or may be discounted in ranking sufficiently so as not to appear in the newsfeed 300B. The manner in which this discounted ranking was computed will be discussed in further detail below with respect to FIG. 4. Reshare option 355B is depicted in dashed lines to indicate that online system 140 may refrain from generating for display reshare option 355B in accordance with embodiments of the disclosure described below with respect to FIG. 4.

Figure 4:
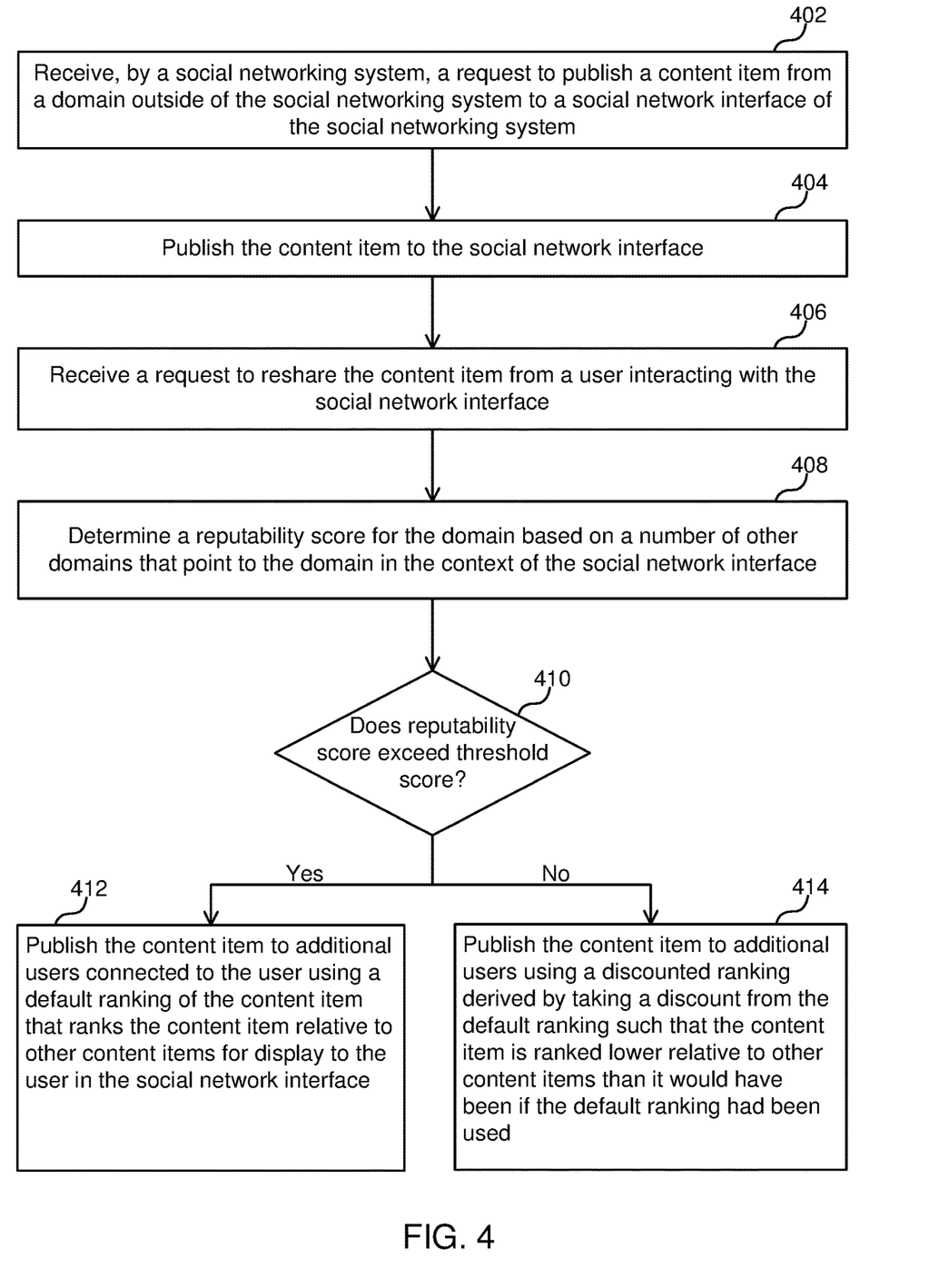
FIG. 4 is an exemplary flowchart illustrating a process for reducing virality of content items coming from sources with questionable reputability, in accordance with an embodiment.

FIG. 4 is an exemplary flowchart illustrating a process for reducing virality of content items from sources having questionable reputability, in accordance with an embodiment. Process 400 begins with social networking system 140 (also referred to as online system 140) receiving 402, from a domain outside of the social networking system, a request to publish a content item to a social network interface of the social networking system. For example, a web service that publishes news articles and opinion articles publishes post 350A, entitled "Breaking News!!! New Evidence that Proves the World is Flat!" Post 350A may be published from client device 110. Social networking system 140 receives the contents of post 350A (e.g., the contents of the headline of the article, which may include associated audio and/or visual content) over network 120 and stores those contents in user profile store 205 or content store 210. Additionally, in response to receiving the request, social networking system 140 publishes 404 the content item to the social network interface (e.g., by causing a newsfeed, such as newsfeed 300A (and potentially other newsfeeds) to include post 350A.

Social networking system 140 receives 406 a request to reshare the content item from a user interacting with the social network interface. For example, social networking system 140 detects a selection (e.g., by John, in the context of newsfeed 300A) of reshare option 355A. Upon detecting the selection of reshare option 355A (e.g., by receiving data indicating that reshare option 355A has been selected from client device 110 over network 120), social networking system 140 may determine to publish post 350A to newsfeeds of friends, or first-order connections, of John, in a selective manner based on the domain from which post 350A originated.

In connection with determining whether and when to cause newsfeeds of, e.g., friends of John to view post 350A, in response to receiving the request to reshare the content item, social networking system 140 determines 408 a reputability score for the domain based on a number of other domains that point to the domain in the context of the social network interface. Social networking system 140 may also, or alternatively, perform determination 408 in connection with determining in what part of newsfeed 300A to place post 350A when causing other newsfeeds to include post 350A as a consequence of reshare option 355A having been selected. In some embodiments, social networking system 140 tracks pointers from one domain to another domain, or from users of social networking system 140 to domains. The word pointers (and variants thereof), as used herein, refer to associations between domains, or between a user and a domain, such as links to the pointed to domain, mentions of the domain (e.g., a user posting accolades about a domain on his or her own newsfeed), registered interactions with the domain (e.g., a user "liking" the domain), and any other association formed by a user or a domain with reference to another domain. The social networking system may correlate an amount of pointers to reputability, with a higher amount of pointers corresponding to a higher reputability. This is similar to other page ranking algorithms, and may be enabled similarly, based on pointers known to the social networking system 140 (and in conjunction with other factors).

In some embodiments, social networking system 140, when determining the reputability score, may access a database comprising entries that map known domains to respective reputability scores. For example, rather than compute on-the-fly reputability score for a domain from which post 350A originated when reshare option 355A is selected, social networking system 140 may instead periodically update reputability scores for various domains in a database, such as reputability score index 230. While reputability score index 230 is depicted as a component of social networking system 140, reputability score index 230 may optionally be a third party system, which social networking system 140 may query through network 120 to request reputability scores for domains. In any case, social networking system 140 (or a third party system that manages reputability score index 230) may periodically update reputability score index 230 based on an updated determination of the number of other domains that point to each domain of the known domains. For example, associations may change over time (e.g., a user may delete a mention of a domain, thus reducing the number of pointers to that domain by 1), and thus periodic updating of reputability score index 230 will ensure more accurate reputability scores are retrieved.

Social networking service 140 determines 410 whether the reputability score exceeds (or equals or exceeds) a threshold score. As used herein, the term threshold score refers to a minimum reputability score that must be met or exceeded for a reshared post (e.g., post 350A) to be published to other newsfeeds (e.g., friends' newsfeeds) at a default ranking (to be described further below). If the threshold score is not met, then the reshared post (e.g., post 350A) will be published at a discounted ranking (to be described further below). The threshold reputability score may be defined by an administrator of social networking service 140 and stored at a database of social networking service 140 (e.g., at content store 210). Different threshold reputability scores may be retrieved from the database by social networking service 140, each corresponding to a different type of content (e.g., news content may require a higher threshold reputability score than satire, since news content is more likely to be taken seriously than satire by users). In some embodiments, the threshold may be determined dynamically based on any number of parameters, either taken individually or together. For example, different threshold reputability scores may also be retrieved that correspond to different countries of origin. The threshold reputability scores may be taken together based on both country of origin and type of content (e.g., by performing a statistical operation such as averaging the reputability scores associated with each relevant parameter). Threshold reputability scores for any number of parameters may be defined by an administrator of social networking service 140, as well as mechanisms for taking the reputability scores together or separately.

In response to determining that the reputability score exceeds the threshold score, social networking service 140 publishes 412 the content item to additional users connected to the user using a default ranking of the content item that ranks the content item relative to other content items for display to the user in the social network interface. For context, when selecting what items to generate for display in a given newsfeed (e.g., newsfeed 350A), social networking system 140 is selecting from a plethora of candidate items—far more than could possibly be displayed. A ranking algorithm is used by social networking system to select the items, as discussed above in connection with newsfeed manager 260. The term default ranking as used herein refers to the algorithm being used by newsfeed manager 260 without any modification. In other words, sufficiently reputable items are processed by the algorithm as normal such that these content items are ranked for each user (e.g., according to predicted user interest in the items and/or the persons posting the items, along with various other factors) for ordering within newsfeed user interface.

Social networking service 140, in response to determining that the reputability score does not exceed the threshold score, publishes 414 the content item to the additional users using a discounted ranking derived from taking a discount from the default ranking such that the content item is ranked lower relative to other content items than it would have been if the default ranking had been used. For example, consistent with the discussion above about default rankings, social networking system 140 may be more likely to place post 350A lower in users' newsfeeds 300A, or to omit post 350A entirely from users' newsfeeds, than it would have been had a default ranking instead been used (e.g., by newsfeed manager 260). In some embodiments, the discounted ranking is derived based on a logarithmic transformation of the reputability score. In some embodiments, social networking system 140 determines that an additional user (e.g., a friend of John) that is connected with the user by way of the social network interface has accessed a newsfeed, and, in response to determining that the additional user has accessed the newsfeed, the social networking service 140 determines a probability that the newsfeed will include the content item based on a ranking of the content item, the ranking being either the default ranking or the discounted ranking.

FIGS. 3A and 3B illustrate the comparative difference between use of a default ranking and a discounted ranking for post 350A. As depicted in FIG. 3A, a portion of newsfeed 350A that is highly ranked by the newsfeed algorithm and thus toward the top of the newsfeed (as indicated by scroll bar 390A being at the top) is displayed. By contrast, as depicted in FIG. 3B, the same post 350B is displayed far lower in the newsfeed due to the discounted ranking, as evidenced by the low position of scroll bar 390B. As explained above, the discounted ranking may cause post 350B to be more likely to be omitted entirely from newsfeed 300B, rather than just displayed lower relative to post 350A. For example, when John accesses a newsfeed and the system ranks the candidate content items to be presented to John in that newsfeed, certain candidates can be discounted in a way that removes them as candidates entirely or can be discounted such that they appear much lower in the newsfeed and are less likely to ever be seen by John. Thus, the use of discounted versus default ranking may play a large role in whether John ever sees and thus reshares post 350A himself, and this then also affects whether that post continues to spread to other users who may also then reshare. In other words, a discounted ranking or a demoted positioning in a newsfeed of a content item or post may prevent the post from spreading or going viral.

There are scenarios where, notwithstanding a low reputability score (relative to the threshold score), it may be inappropriate to apply a discounted ranking to a post (e.g., post 350A). For example, in response to determining that the reputability score does not exceed the threshold score, social networking system 140 may determine whether the domain is in direct control of a political figure, such as a senator, a congressman, a candidate for mayor, or a candidate or active serving politician. In some embodiments, social networking system 140 may make this determination by first determining an owner of the domain (e.g., by referencing a domain registry for ownership). Social networking system 140 may then compare the owner of the domain against an index of political figures. For example, whitelist index 235 may be a database indicating political figures that may be referenced against. While whitelist index 235 is depicted as a component of social networking system 140 in FIG. 2, whitelist index 235 may be a database managed by a third party actor and may be accessed by way of network 120. If the owner is found within the database, social networking system 140 may determine that the domain is in direct control of a political figure, and may thus refrain from publishing the content item to the additional users using the discounted ranking, and instead may publish the content item to the additional users using the default ranking.

Similar to the above discussion about political figures, there may be other entities that would be inappropriate to discount rankings for, regardless of low reputability scores. For example, local news sources are sources that may by an only source of local news to residents of a particular municipality, and discounting ranking of stories from those local news stories may stifle circulation of local news. Thus, local news operators may be included in whitelist index 235. In such scenarios, further in response to determining that the reputability score does not exceed the threshold score, social networking system 140 may determine whether the domain is a news source that primarily publishes content items relating to a municipality smaller than a threshold size (e.g., by referencing whitelist index 235, which may include entries of such news sources). In response to determining that the domain is a news source that primarily publishes content items relating to a municipality smaller than the threshold size, social networking system 240 may refrain from publishing the content item to the additional users using the discounted ranking, and instead may publish the content item to the additional users using the default ranking.

While local news sources and political figures were described in detail here, social networking system 140 may create a "safe harbor" from discounted rankings for any category of domain, and may add qualifying domains to whitelist index 235. To this end, an administrator may directly add named entities to whitelist index 235. In some embodiments, the administrator may indicate parameters to the social networking system 140 (e.g., news sources with less than 100,000 daily website visits), and social networking system 140 may, when receiving posts from unknown domains, determine whether the domain meets known safe harbor parameters and responsively, if the unknown domain qualifies, add the domain to whitelist index 235 and/or refrain from using a discounted ranking regardless of reputability score for that domain. Social networking system 140 may periodically reevaluate whitelist index 235 for continued compliance of added entities, and may remove entities that no longer meet specified parameters.

In some embodiments, in response to receiving the request to publish the content item, social networking system 140 may determine the reputability score for the domain based on the number of other domains that point to the domain in the context of the social network interface, and, in response to determining that the reputability score for the domain is below a minimum reshare threshold, social networking system 140 may prevent the user from resharing the content item. For example, as depicted in FIG. 3B, social networking system 140 may publish post 350B with a discounted ranking to newsfeed 300B, but may omit reshare option 355B in connection with post 350B. Omitting reshare option 355B for content with a low reputability score may prevent such content from becoming viral (since the content cannot be reshared within social networking system 14), while still allowing the content to reach users to whom the domain is connected.

Social networking system 140, in response to receiving the request to publish the content item, may determine whether the content item was published to a public forum or to a private forum. For example, social networking system 140 may determine whether a select group of people (e.g., first order connections) or any users (e.g., sponsored content that may appear on any user's newsfeed, or any user who satisfies targeting criterion), are to see post 350B. In response to determining that the content item was published to a public forum, social networking system 140 may enable the user to request to reshare the content item (e.g., by enabling reshare option 355B). In response to determining that the content item was published to a private forum, social networking system 140 may prevent the user from resharing the content item (e.g., by disabling reshare option 355B). In some embodiments, such determination may be performed for low reputability score content. In other embodiments, such determination may be performed for all content.

In some embodiments, social networking system 140, further in response to determining that the reputability score does not exceed the threshold score, may monitor a frequency in which the content item is accessed by the additional users after being published to the additional users using the discounted ranking. Social networking system may determine whether the frequency exceeds an alert threshold, and, in response to determining that the frequency exceeds the alert threshold, may alert an administrator. For example, there are times that even using the preventative measures described herein, social networking service 140 may facilitate virality of content from sources having questionable reputability. To mitigate this risk, social networking service 140 may, if such content is reshared or otherwise accessed a statistically unusually high amount of times in a short period of time, alert an administrator to determine whether further remedial action should be taken with respect to enabling the content to be reshared.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, by a social networking system, a request to publish a content item from a domain outside of the social networking system to a social network interface of the social networking system;
   in response to receiving the request, publishing the content item to the social network interface;
   receiving a request to reshare the content item from a user interacting with the social network interface;
   in response to the receiving of the request to reshare the content item, determining a reputability score for the domain based on a number of other domains that point to the domain in a context of the social network interface;
   determining whether the reputability score exceeds a threshold score;
   in response to the determining that the reputability score exceeds the threshold score, publishing the content item to additional users connected to the user using a default ranking of the content item that ranks the content item relative to the other content items for display to the user in the social network interface; and
   in response to determining that the reputability score does not exceed the threshold score:
     determining whether the domain is in direct control of a political figure;
     in response to the determining that the domain is in the direct control of the political figure, publishing the content item to the additional users using the default ranking; and
     in response to determining that the domain is not in the direct control of the political figure, publishing the content item to the additional users using a discounted ranking derived from taking a discount from the default ranking such that the content item is ranked lower relative to other content items than it would have been if the default ranking had been used.

2. The method of claim 1, further comprising:
   determining that an additional user that is connected with the user by way of the social network interface has accessed a newsfeed; and
   in response to the determining that the additional user has accessed the newsfeed, determining a probability that the newsfeed will include the content item based on a ranking of the content item, the ranking being either the default ranking or the discounted ranking.

3. The method of claim 1, wherein determining whether the domain is in direct control of the political figure comprises:
   determining an owner of the domain;
   comparing the owner of the domain against an index of political figures; and in response to determining, based on the comparing, that the owner is listed in the index, determining that the domain is in direct control of the political figure.

4. The method of claim 1, further comprising, further in response to determining that the reputability score does not exceed the threshold score:
   determining whether the domain is a news source that primarily publishes content items relating to a municipality smaller than a threshold size; and
   in response to determining that the domain is a news source that primarily publishes content items relating to the municipality smaller than the threshold size, refraining from publishing the content item to the additional users using the discounted ranking, and instead publishing the content item to the additional users using the default ranking.

5. The method of claim 1, wherein the determining of the reputability score comprises:
   accessing a database comprising entries that map known domains to respective reputability scores, wherein the database periodically updates the respective reputability scores based on an updated determination of the number of other domains that point to each domain of the known domains; and
   retrieving the reputability score from an entry of the entries that corresponds to the domain.

6. The method of claim 1, further comprising:
   in response to the receiving of the request to publish the content item, determining the reputability score for the domain based on the number of other domains that point to the domain in the context of the social network interface; and
   in response to determining that the reputability score for the domain is below a minimum reshare threshold, preventing the user from resharing the content item.

7. The method of claim 1, further comprising:
   in response to receiving the request to publish the content item, determining whether the content item was published to a public forum or to a private forum;
   in response to determining that the content item was published to the public forum, enabling the user to request to reshare the content item; and
   in response to determining that the content item was published to the private forum, preventing the user from resharing the content item.

8. The method of claim 1, further comprising, further in response to determining that the reputability score does not exceed the threshold score:
   monitoring a frequency in which the content item is accessed by the additional users after being published to the additional users using the discounted ranking;
   determining whether the frequency exceeds an alert threshold; and
   in response to the determining that the frequency exceeds the alert threshold, alerting an administrator.

9. The method of claim 1, wherein the discounted ranking is derived based on a logarithmic transformation of the reputability score.

10. A computer program product comprising a computer-readable storage medium containing computer program code for:
    receiving, by a social networking system, a request to publish a content item from a domain outside of the social networking system to a social network interface of the social networking system;
    in response to the receiving of the request, publishing the content item to the social network interface;
    receiving a request to reshare the content item from a user interacting with the social network interface;
    in response to the receiving of the request to reshare the content item, determining a reputability score for the domain based on a number of other domains that point to the domain in a context of the social network interface;
    determining whether the reputability score exceeds a threshold score;
    in response to the determining that the reputability score exceeds the threshold score, publishing the content item to additional users connected to the user using a default ranking of the content item that ranks the content item relative to the other content items for display to the user in the social network interface; and
    in response to determining that the reputability score does not exceed the threshold score:
       determining whether the domain is in direct control of a political figure;
       in response to the determining that the domain is in the direct control of the political figure, publishing the content item to the additional users using the default ranking; and
       in response to determining that the domain is not in the direct control of the political figure, publishing the content item to the additional users using a discounted ranking derived from taking a discount from the default ranking such that the content item is ranked lower relative to other content items than it would have been if the default ranking had been used.

11. The computer program product of claim 10, wherein the computer-readable storage medium further contains computer program code for:
    determining that an additional user that is connected with the user by way of the social network interface has accessed a newsfeed; and
    in response to the determining that the additional user has accessed the newsfeed, determining a probability that the newsfeed will include the content item based on a ranking of the content item, the ranking being either the default ranking or the discounted ranking.

12. The computer program product of claim 10, wherein determining whether the domain is in direct control of the political figure comprises:
    determining an owner of the domain;
    comparing the owner of the domain against an index of political figures; and
    in response to the determining, based on the comparing, that the owner is listed in the index, determining that the domain is in direct control of the political figure.

13. The computer program product of claim 10, wherein the computer-readable storage medium further contains computer program code for, further in response to the determining that the reputability score does not exceed the threshold score:
    determining whether the domain is a news source that primarily publishes content items relating to a municipality smaller than a threshold size; and
    in response to determining that the domain is a news source that primarily publishes content items relating to the municipality smaller than the threshold size, refraining from publishing the content item to the additional users using the discounted ranking, and instead publishing the content item to the additional users using the default ranking.

14. The computer program product of claim 10, wherein the determining of the reputability score comprises:
   accessing a database comprising entries that map known domains to respective reputability scores, wherein the database periodically updates the respective reputability scores based on an updated determination of the number of other domains that point to each domain of the known domains; and
   retrieving the reputability score from an entry of the entries that corresponds to the domain.

15. The computer program product of claim 10, wherein the computer-readable storage medium further contains computer program code for:
   in response to the receiving of the request to publish the content item, determining the reputability score for the domain based on the number of other domains that point to the domain in the context of the social network interface; and
   in response to determining that the reputability score for the domain is below a minimum reshare threshold, preventing the user from resharing the content item.

16. The computer program product of claim 10, wherein the computer-readable storage medium further contains computer program code for:
   in response to the receiving of the request to publish the content item, determining whether the content item was published to a public forum or to a private forum;
   in response to determining that the content item was published to the public forum, enabling the user to request to reshare the content item; and
   in response to determining that the content item was published to the private forum, preventing the user from resharing the content item.

17. The computer program product of claim 10, wherein the computer-readable storage medium further contains computer program code for, further in response to the determining that the reputability score does not exceed the threshold score:
   monitoring a frequency in which the content item is accessed by the additional users after being published to the additional users using the discounted ranking;
   determining whether the frequency exceeds an alert threshold; and
   in response to determining that the frequency exceeds the alert threshold, alerting an administrator.

18. The computer program product of claim 10, wherein the discounted ranking is derived based on a logarithmic transformation of the reputability score.

* * * * *